(12) United States Patent
Sun et al.

(10) Patent No.: US 12,429,928 B2
(45) Date of Patent: Sep. 30, 2025

(54) BODY STRUCTURE OF PORTABLE COMPUTER

(71) Applicant: Acer Incorporated, New Taipei (TW)

(72) Inventors: Hui-Ping Sun, New Taipei (TW);
Jui-Yi Yu, New Taipei (TW);
Chun-Hung Wen, New Taipei (TW);
Yen-Chou Chueh, New Taipei (TW);
Chun-Hsien Chen, New Taipei (TW)

(73) Assignee: Acer Incorporated, New Taipei (TW)

( * ) Notice: Subject to any disclaimer, the term of this patent is extended or adjusted under 35 U.S.C. 154(b) by 202 days.

(21) Appl. No.: 18/354,657

(22) Filed: Jul. 19, 2023

(65) Prior Publication Data

US 2024/0168526 A1 May 23, 2024

(30) Foreign Application Priority Data

Nov. 23, 2022 (TW) .................................. 111144885

(51) Int. Cl.
*G06F 1/16* (2006.01)
*G06F 3/0354* (2013.01)
*G06F 3/041* (2006.01)

(52) U.S. Cl.
CPC ................ *G06F 1/169* (2013.01); *G06F 1/16* (2013.01); *G06F 1/1613* (2013.01); *G06F 1/1616* (2013.01); *G06F 1/1633* (2013.01); *G06F 1/1662* (2013.01); *G06F 1/1684* (2013.01); *G06F 3/03547* (2013.01); *G06F 3/041* (2013.01)

(58) Field of Classification Search
CPC ........ G06F 1/16; G06F 1/1613; G06F 1/1615; G06F 1/1616; G06F 1/1633; G06F 1/1637; G06F 1/1656; G06F 1/1658; G06F 1/1662; G06F 1/1684; G06F 1/169; G06F 3/03547; G06F 3/041
USPC ...................................................... 361/679.27
See application file for complete search history.

(56) References Cited

U.S. PATENT DOCUMENTS

| | | | | |
|---|---|---|---|---|
| 5,793,355 | A * | 8/1998 | Youens ................. | G06F 1/1616 345/157 |
| 7,119,291 | B2 * | 10/2006 | Sun .......................... | G06F 1/169 345/157 |
| 7,385,808 | B2 * | 6/2008 | Hamada ................ | G06F 1/1662 400/486 |
| 7,544,904 | B2 * | 6/2009 | Nakatani ............... | G06F 1/1616 200/520 |
| 7,723,624 | B2 * | 5/2010 | Nakajima ............. | G06F 1/1656 200/302.1 |

(Continued)

*Primary Examiner* — Allen L Parker
*Assistant Examiner* — Gage Crum
(74) *Attorney, Agent, or Firm* — JCIPRNET

(57) ABSTRACT

A body structure of a portable computer including a case, a keyboard module, a touch pad module, and a cover. The case has an inner surface and an exterior surface opposite to each other, and the exterior surface is exposed to an outer environment. The case further has a first receiving opening, a second receiving opening, and a rib structure separating the first and the second receiving openings. The keyboard module is assembled to the second receiving opening from the exterior surface and locked at the rib structure. The touch pad module is assembled to the first receiving opening from the exterior surface and locked at the rib structure. The cover is assembled to the case and covers the rib structure.

9 Claims, 6 Drawing Sheets

(56) References Cited

U.S. PATENT DOCUMENTS

| | | | | |
|---|---|---|---|---|
| 7,990,693 B2* | 8/2011 | Nakajima | | H01H 13/70 |
| | | | | 361/679.08 |
| 8,294,675 B2* | 10/2012 | Mathew | | G06F 1/1616 |
| | | | | 178/18.08 |
| 8,803,852 B2* | 8/2014 | Tsai | | G06F 1/169 |
| | | | | 345/184 |
| 8,964,378 B2* | 2/2015 | Kao | | G06F 1/169 |
| | | | | 361/679.55 |
| 9,110,638 B2* | 8/2015 | Yang | | G06F 1/169 |
| 9,465,416 B2* | 10/2016 | Shen | | G06F 1/1692 |
| 9,536,683 B2* | 1/2017 | Ho | | H01H 3/12 |
| 9,563,237 B2* | 2/2017 | Hoshi | | G06F 1/169 |
| 9,817,493 B2* | 11/2017 | Tzeng | | G06F 3/03547 |
| 9,958,907 B2* | 5/2018 | Kitamura | | G06F 3/03547 |
| 10,234,967 B2* | 3/2019 | Huang | | G06F 1/169 |
| 10,606,323 B1* | 3/2020 | Chang | | H05K 5/0226 |
| 10,768,674 B2* | 9/2020 | Lee | | G06F 1/1681 |
| 11,093,009 B2* | 8/2021 | Huang | | G06F 1/169 |
| 11,287,907 B1* | 3/2022 | Li | | G06F 3/03547 |
| 11,402,931 B1* | 8/2022 | Lee | | G06F 1/1616 |
| 11,481,048 B2* | 10/2022 | Kuo | | G06F 3/03547 |
| 11,537,177 B2* | 12/2022 | Pai | | G06F 1/169 |
| 11,556,189 B1* | 1/2023 | Lee | | G06F 3/016 |
| 11,733,743 B1* | 8/2023 | Chang | | G06F 3/041 |
| | | | | 345/173 |
| 12,306,679 B2* | 5/2025 | Radloff | | G06F 3/0202 |
| 2004/0246669 A1* | 12/2004 | Minaguchi | | G06F 1/1616 |
| | | | | 361/679.09 |
| 2006/0022957 A1* | 2/2006 | Lee | | G06F 3/03547 |
| | | | | 345/173 |
| 2006/0044751 A1* | 3/2006 | Peng | | G06F 3/03547 |
| | | | | 361/679.19 |
| 2008/0019085 A1* | 1/2008 | Nakajima | | G06F 1/1662 |
| | | | | 361/679.08 |
| 2008/0239641 A1* | 10/2008 | Sato | | G06F 1/1658 |
| | | | | 29/428 |
| 2011/0075336 A1* | 3/2011 | Chiang | | G06F 1/169 |
| | | | | 361/679.02 |
| 2011/0149534 A1* | 6/2011 | Hamada | | G06F 3/03547 |
| | | | | 361/756 |
| 2011/0193813 A1* | 8/2011 | Gralewski | | G06F 3/041 |
| | | | | 345/173 |
| 2011/0254788 A1* | 10/2011 | Wang | | G06F 3/0338 |
| | | | | 345/173 |
| 2012/0050973 A1* | 3/2012 | Sakuma | | G06F 1/1662 |
| | | | | 361/679.09 |
| 2012/0134089 A1* | 5/2012 | Wu | | G06F 1/169 |
| | | | | 361/679.4 |
| 2012/0314347 A1* | 12/2012 | Zhang | | G06F 1/169 |
| | | | | 361/679.1 |
| 2013/0176671 A1* | 7/2013 | Saito | | G06F 3/0202 |
| | | | | 361/679.09 |
| 2013/0234938 A1* | 9/2013 | Xue | | G06F 3/03547 |
| | | | | 345/158 |
| 2016/0116947 A1* | 4/2016 | Matsuoka | | G06F 1/1658 |
| | | | | 361/679.55 |
| 2019/0258290 A1* | 8/2019 | Song | | G06F 1/1692 |

* cited by examiner

BODY STRUCTURE OF PORTABLE COMPUTER

CROSS-REFERENCE TO RELATED APPLICATION

This application claims the priority benefit of Taiwan application serial no. 111144885, filed on Nov. 23, 2022. The entirety of the above-mentioned patent application is hereby incorporated by reference herein and made a part of this specification.

BACKGROUND

Technical Field

The present disclosure relates to a body structure, and particularly to a body structure of a portable computer.

Description of Related Art

A portable computer, such as a notebook computer, is generally equipped with a keyboard module and a touch pad module as an input interface, the function of the touch pad module can replace the function of a mouse, and the left and right buttons are generally arranged below the touch area to correspond to the functions of the left and the right buttons on the mouse.

Generally speaking, the design and assembly logic of the keyboard module and the touch pad module are based on structural stability, so they are mostly assembled from the inside of the case of the host, and then the buttons and the touch surface are exposed by the case. However, once the keyboard module and the touch pad module need to be repaired, it is necessary to remove the case from the backside of the host, and then remove the internal components (such as a battery, a motherboard, and a heat dissipation module one by one) in the host, and finally disassemble the keyboard module or the touch pad module. Therefore, the existing design logic and assembly process cause the burden of maintenance.

SUMMARY

The disclosure provides a body structure of a portable computer configured to simplify the process of disassembling and assembling a keyboard module and a touch pad module, so as to provide convenience.

The present disclosure provides a body structure of a portable computer including a case, a keyboard module, a touch pad module, and a cover. The case has an inner surface and an exterior surface opposite to each other, and the exterior surface is exposed to an outer environment. The case further has a first receiving opening, a second receiving opening, and a rib structure separating the first and the second receiving openings. The keyboard module is assembled to the second receiving opening from the exterior surface and locked at the rib structure. The touch pad module is assembled to the first receiving opening from the exterior surface and locked at the rib structure. The cover is assembled to the case and covers the rib structure.

Based on the above, in the body structure of the portable computer of the disclosure, the case is provided with a rib structure to separate a first receiving opening and a second receiving opening. After a touch pad module and a keyboard module respectively accommodate in the first receiving opening and the second receiving opening, the touch pad module and the keyboard module are locked together on the rib structure, and a cover is finally assembled to the case to cover the rib structure. In this way, the body structure of the portable computer of the disclosure provides a process of assembling a touch pad module and a keyboard module from the exterior surface of the case. Accordingly, the complicated process of disassembling components one by one for subsequent maintenance can be effectively avoided.

In order to make the above and other features and advantages of the disclosure more evident and easier to understand, the following embodiments are provided and represented in detail with the accompanying drawings as follows.

DESCRIPTION OF THE EMBODIMENTS

Figure 1:
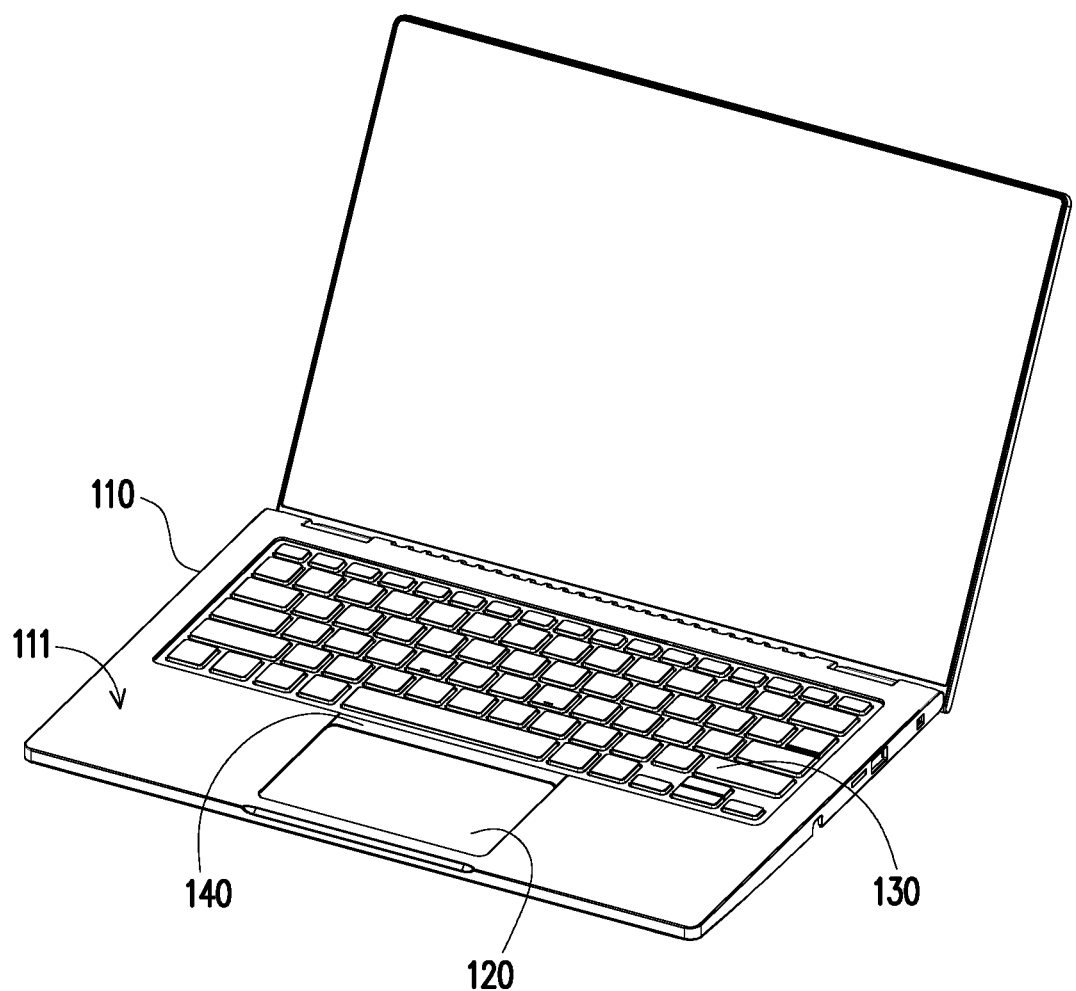
FIG. 1 is a schematic view of a portable computer according to an embodiment of the present disclosure.
Figure 2A:
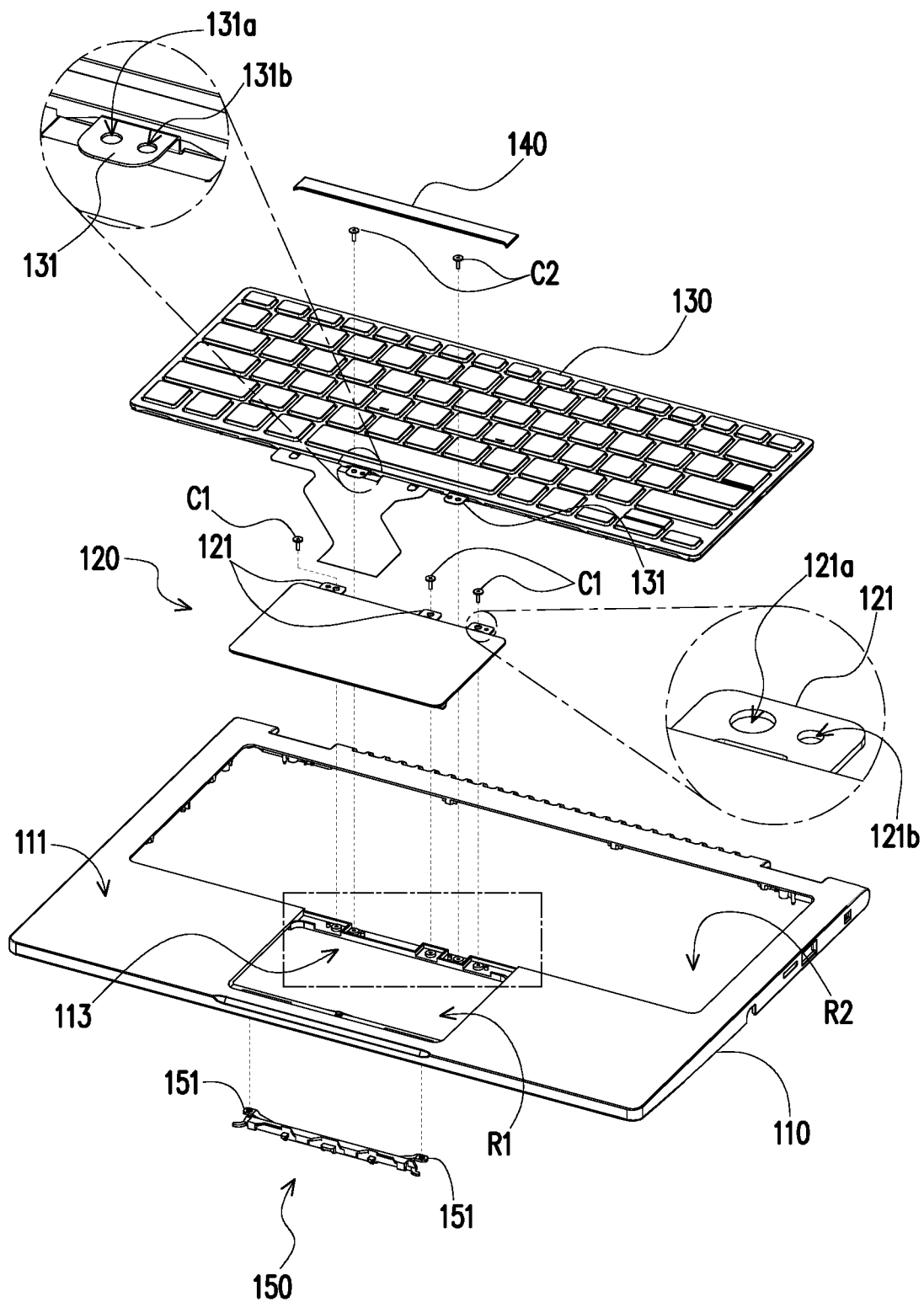
FIG. 2A is an exploded view of some components of the portable computer in FIG. 1.
Figure 2B:
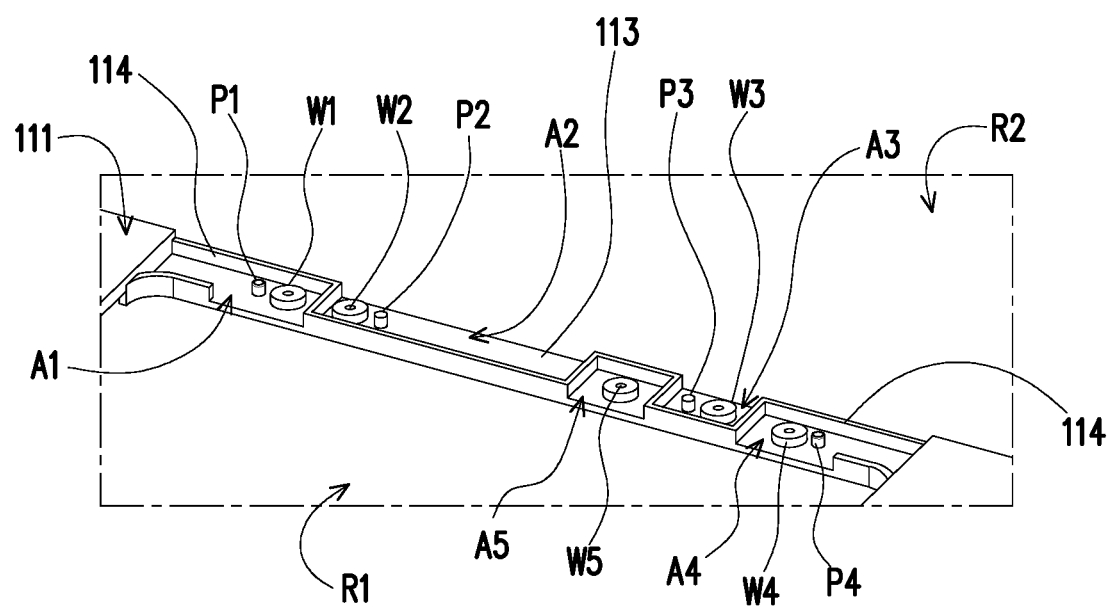
FIG. 2B is a partial enlarged view of FIG. 2A.

FIG. 1 is a schematic view of a portable computer according to an embodiment of the present disclosure. FIG. 2A is an exploded view of some components of the portable computer in FIG. 1. FIG. 2B is a partial enlarged view of FIG. 2A. Referring to FIG. 1, FIG. 2A and FIG. 2B simultaneously, in this embodiment, the body structure of the portable computer 100 (such as a notebook computer) includes a case 110, a keyboard module 130, a touch pad module 120, and a cover 140. The case 110 has an exterior surface 111 and an inner surface 112 opposite to each other, and the exterior surface 111 is exposed to the external environment. The case 110 further has a first receiving opening R1, a second receiving opening R2 and a rib structure 113, and the rib structure 113 separates the first receiving opening R1 and the second receiving opening R2. The keyboard module 130 is assembled to the second receiving opening R2 from the exterior surface 111 and locked at the rib structure 113. The touch pad module 120 is assembled to the first receiving opening R1 from the exterior surface 111 and locked at the rib structure 113. The cover 140 is assembled on the case 110 and covers the rib structure 113.

Furthermore, the case 110 further has a plurality of locking parts W1 to W5 arranged on the rib structure 113, and the touch pad module 120 and the keyboard module 130 have a plurality of locking tabs 121 and 131, respectively. The locking tabs 121 and 131 are locked at the locking parts W1 to W5 on the rib structure 113 through a plurality of locking members C1 and C2. In this embodiment, the locking parts W1 to W5 may be protrusions with built-in screw holes, and the locking members C1 and C2 may be screws, so as to achieve the required locking and fixing effects.

Specifically, the case 110 of this embodiment further has a side wall 114, which is erected on the rib structure 113 and extends in a bent manner (and therefore generates multiple openings), so as to divide the upper surface of the rib structure 113 into a plurality of sub-areas A1 to A5. These sub-areas A1 to A5 are respectively connected to the first receiving opening R1 or the second receiving opening R2, and the locking parts W1 to W5 are respectively located in the sub-areas A1 to A5. As shown in FIG. 2B, these sub-areas A1 to A5 are substantially alternately connected to the first receiving opening R1 and the second receiving opening R2.

Moreover, the case 110 further includes a plurality of alignment pillars P1-P4 arranged in the sub-areas A1-A4, and the locking parts W1-W4 and the alignment pillars P1-P4 located in the same sub-areas A1-A4 are adjacent to each other to correspond to the same locking tabs 121, 131. For example, as shown in FIG. 2A with FIG. 2B, the locking part W4 and the alignment pillar P4 in the same sub-area A4 are located adjacent to each other, and correspond to the locking tab 121 of the touch pad module 120, so that the alignment pillar P4 penetrates through the opening 121b, and the locking member C1 passes through the opening 121a and is locked at the locking part W4. Similarly, for the keyboard module 130, the alignment pillar P2 located in the sub-area A2 passes through the opening 131b, and the locking member C2 passes through the opening 131a and is locked at the locking part W2.

After the keyboard module 130 and the touch pad module 120 are assembled to the case 110 described as above, the cover 140 can be assembled to the case 110 to cover the rib structure 113 and the locking location in which the touch pad module 120 and keyboard module 130 are locked to the rib structure 113. The cover 140 and the exterior surface 111 of the case 110 are in a coplanar state and have a consistent profile, so that the aforementioned locking structure can be effectively covered and the aesthetics of the case 110 in appearance can be greatly improved. In this embodiment, the cover 140 can serve as a decorative plate of the portable computer 100, on which a relevant logo or an instruction for disassembly and assembly can be provided as required.

Figure 3:
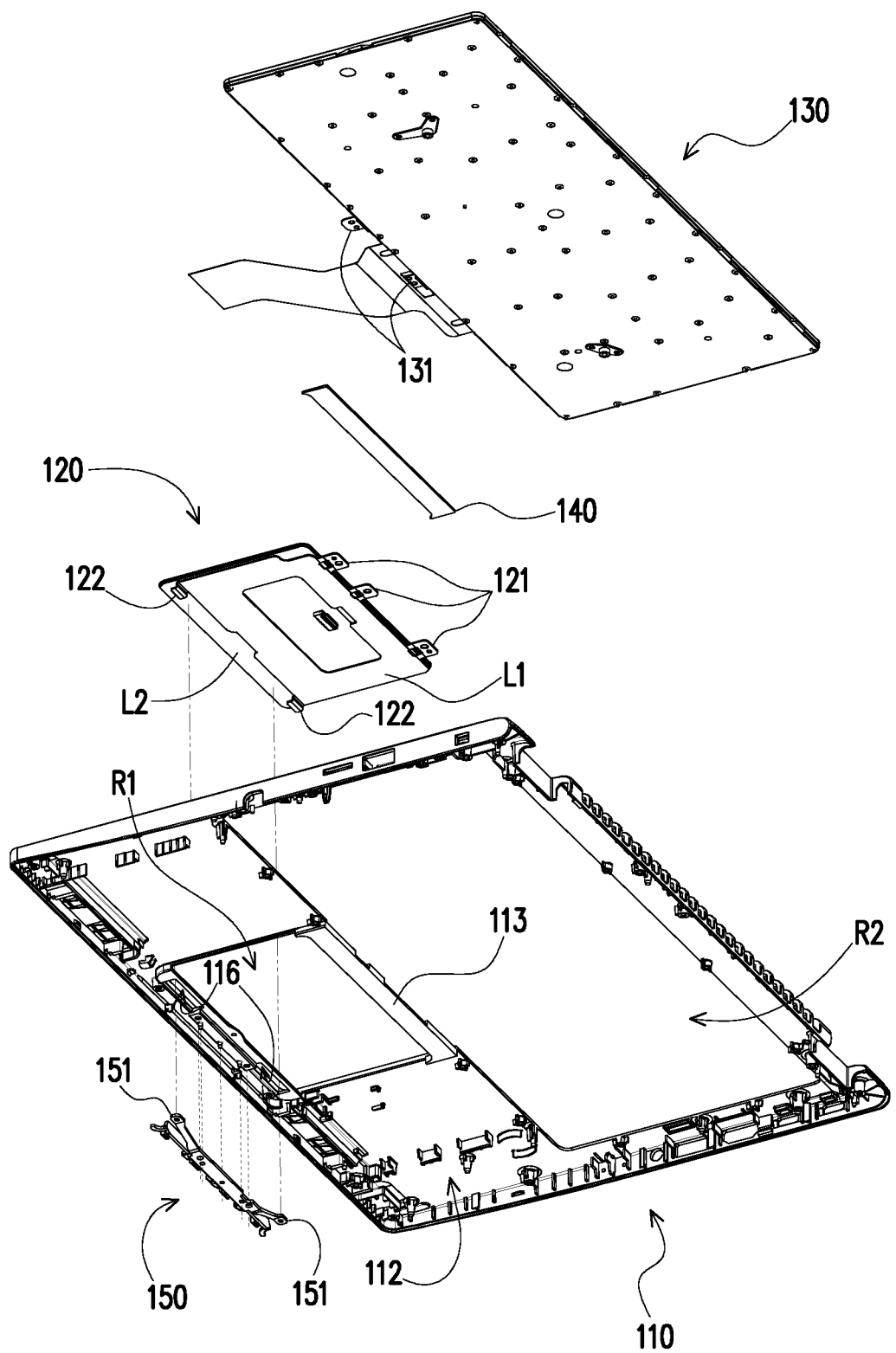
FIG. 3 illustrates the components of FIG. 2A from another view.
Figure 4:
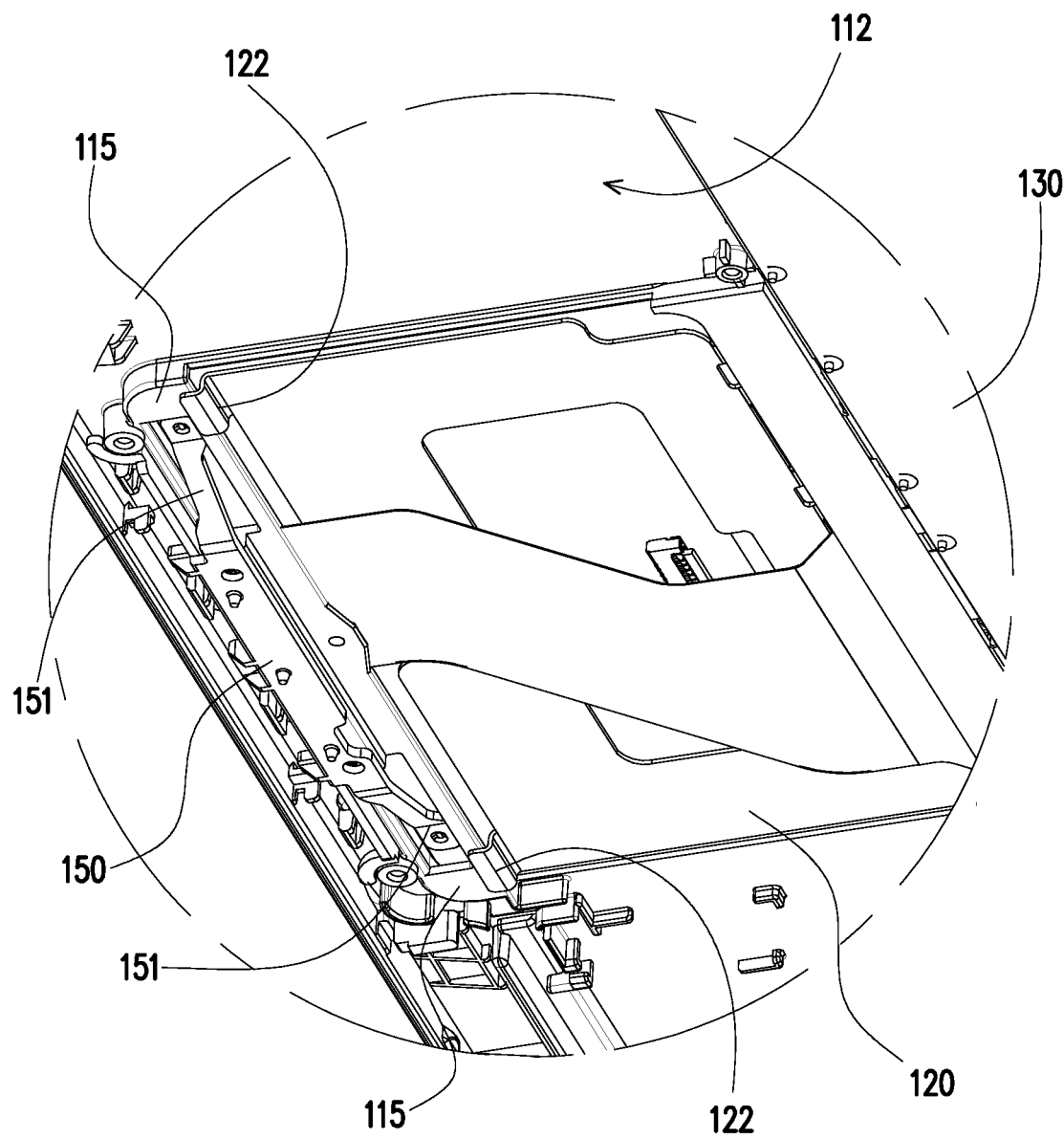
FIG. 4 is a partial enlarged view of the assembled components of FIG. 3.
Figure 5:
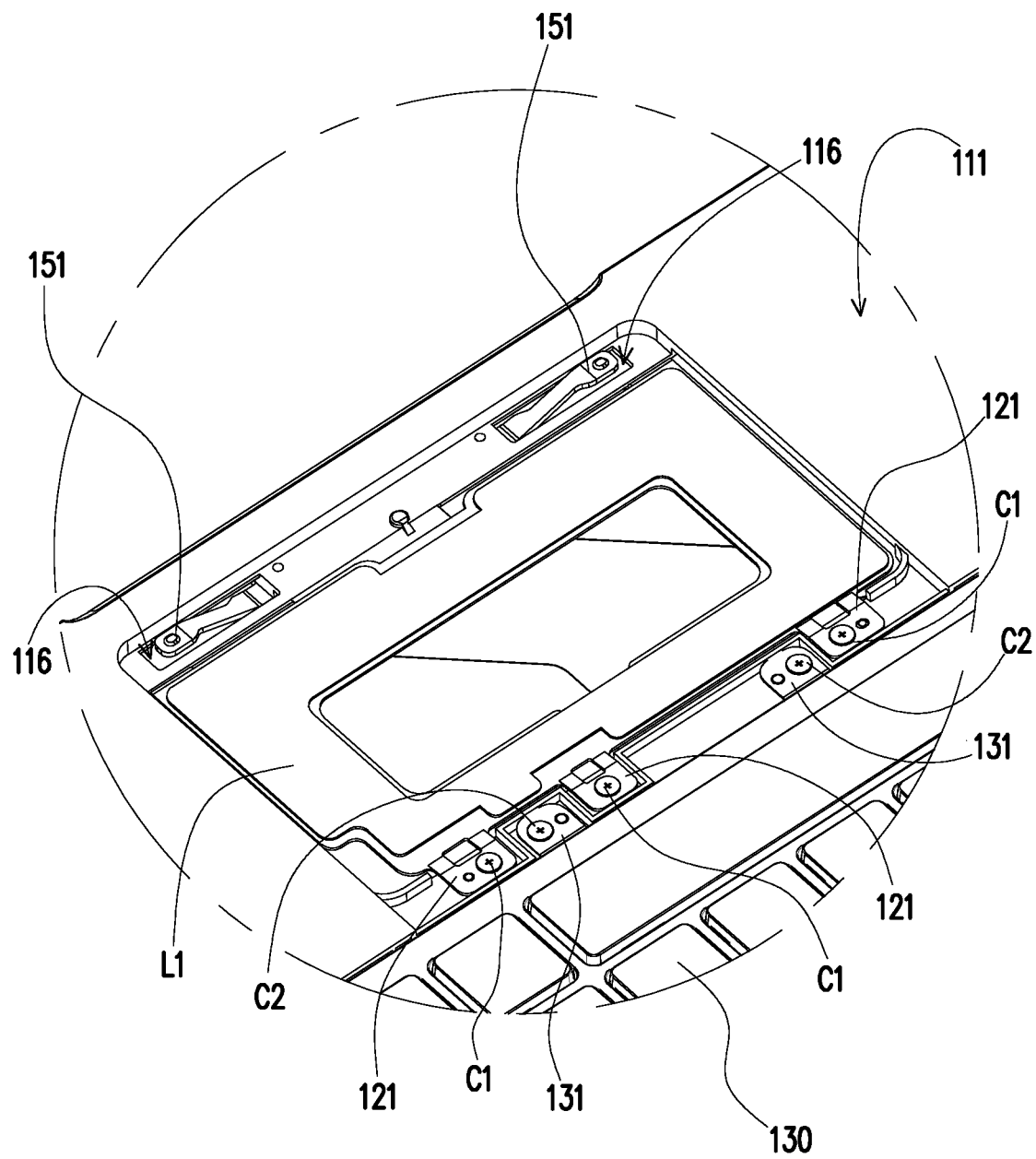
FIG. 5 is a partial enlarged view of the assembled components of FIG. 3 from another view.

FIG. 3 illustrates the components of FIG. 2A from another view. FIG. 4 is a partial enlarged view of the assembled components of FIG. 3. FIG. 5 is a partial enlarged view of the assembled components of FIG. 3 from another view. Referring to FIG. 3 to FIG. 5 simultaneously, in this embodiment, the touch pad module 120 further has a plurality of buckling pieces 122 opposite to the locking tabs 121 of the touch pad module 120, the case 110 further has a plurality of buckling parts 115 located on the inner surface 112 of the case 110, the buckling pieces 122 are buckled on the buckling parts 115, and the buckling parts 115 and the rib structure 113 are opposite to each other and separated by the first receiving opening R1. In this embodiment, the buckling part 115 may be a local thickened structure of the case 110, and the buckling piece 122 extends into and overlaps with the bottom of the buckling part 115, so as to achieve the desired buckling effect. Therefore, during the assembling of the touch pad module 120, the locking pieces 122 first extend into the bottoms of the locking parts 115, and the locking tabs 121 are then locked to the locking parts W1, W4 and W5.

Furthermore, the body structure of the portable computer 100 further includes a holder 150 assembled on the inner surface 112 and abutted against the touch pad module 120. As shown in FIG. 4 and FIG. 5, the case 110 has a plurality of slots 116, and the holder 150 has a plurality of elastic arms 151 respectively passing through the slots 116 to abut against the touch pad module 120. The shots 116 are independent from the first receiving opening R1 (that is; the shots 116 are not connected to the first receiving opening R1). The holder 150 and the rib structure 113 are opposite to each other and separated by the first receiving opening R1. As shown in FIG. 3, the touch pad module 120 includes different layers L1 and L2. The layer L1 may be a metal back plate of the touch pad module, which can be punched and bent to form the locking tabs 121 and the buckling pieces 122, and can serve as a main support structure of the touch pad module 120. The layer L2 may be a circuit board, which can be provided with related electrical connectors and push-button switches. In this embodiment, the elastic arms 151 are provided to correspond to the two push-button switches of the touch pad module 120, so as to provide a click (and feedback) feeling for the user.

To sum up, in the above embodiments of the present disclosure, in the body structure of the portable computer, the case is provided with a rib structure to separate a first receiving opening and a second receiving opening. After a touch pad module and a keyboard module respectively accommodate in the first receiving opening and the second receiving opening, the touch pad module and the keyboard module are locked together on the rib structure, and a cover is finally assembled to the case to cover the rib structure. In this way, the body structure of the portable computer of the disclosure provides a process of assembling a touch pad module and a keyboard module from the exterior surface of the case. Accordingly, the complicated process of disassembling components one by one for subsequent maintenance can be effectively avoided.

Moreover, in order to simplify the locking process, the upper surface of the rib structure is divided into multiple sub-areas by a side wall on the rib structure, so that the multiple locking tabs of the keyboard module and the touch pad module can be alternately locked to the locking parts in these sub-areas. Finally, a cover is assembled to the case, and the cover is coplanar with the exterior surface of the case, so as to achieve the effect of shielding and beauty.

Although the disclosure has been disclosed as above with embodiments, they are not intended to limit the disclosure. People with ordinary skills in the art can make some changes and modifications without departing from the spirit of the disclosure, so the scope of the disclosure shall be defined by the following claims.

What is claimed is:

1. A body structure of a portable computer, comprising:
a case having an exterior surface and an inner surface opposite to each other, wherein the exterior surface is exposed to an external environment, the case further has a first receiving opening, a second receiving opening and a rib structure, and wherein the rib structure separates the first receiving opening and the second receiving opening;
a keyboard module assembled to the second receiving opening from the exterior surface and locked at the rib structure;
a touch pad module assembled to the first receiving opening from the exterior surface and locked at the rib structure; and
a cover assembled to the case, covering the rib structure, and coplanar with the exterior surface,
wherein the case further has a plurality of locking parts arranged on the rib structure, the touch pad module and the keyboard module respectively have a plurality of locking tabs, and the locking tabs are locked to the locking parts on the rib structure through a plurality of locking members,
wherein the case further has a side wall arranged on the rib structure and configured to divide the rib structure into a plurality of sub-areas, each of the plurality of sub-areas is connected to the first receiving opening or the second receiving opening, and the locking parts are respectively located in the sub-areas.

2. The body structure of the portable computer according to claim 1, wherein the sub-areas are alternately connected to the first receiving opening and the second receiving opening.

3. The body structure of the portable computer according to claim 1, wherein the case further includes a plurality of alignment pillars disposed at least in part of the sub-areas, and the locking part and the alignment pillar located in the same sub-area are adjacent to each other and correspond to the same locking tab.

4. The body structure of the portable computer according to claim 1, wherein the touch pad module further has a plurality of buckling pieces opposite to the locking tabs of the touch pad module, the case further has a plurality of buckling parts located on the inner surface, and the buckling pieces are buckled on the buckling parts.

5. The body structure of the portable computer according to claim 4, wherein the buckling parts and the rib structure are opposite to each other and are separated by the first receiving opening.

6. The body structure of the portable computer according to claim 1, further comprising a holder assembled on the inner surface and abutted against the touch pad module.

7. The body structure of the portable computer according to claim 6, wherein the case has a plurality of slots, and the holder has a plurality of elastic arms respectively passing through the slots and abutting against the touch pad module.

8. The body structure of the portable computer according to claim 7, wherein the slots are independent from the first receiving opening.

9. The body structure of the portable computer according to claim 6, wherein the holder and the rib structure are opposite to each other and are separated by the first receiving opening.

* * * * *